May 1, 1928.
T. A. BANNING, JR
1,667,715
INDUCTIVE UNIT AND THE LIKE
Filed Aug. 23, 1926    4 Sheets-Sheet 1
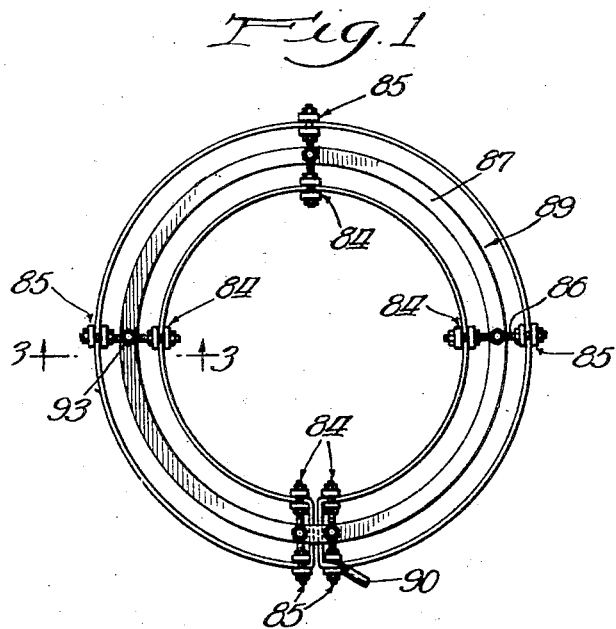
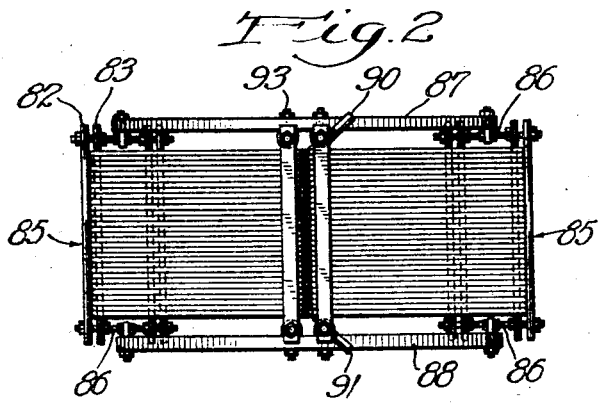
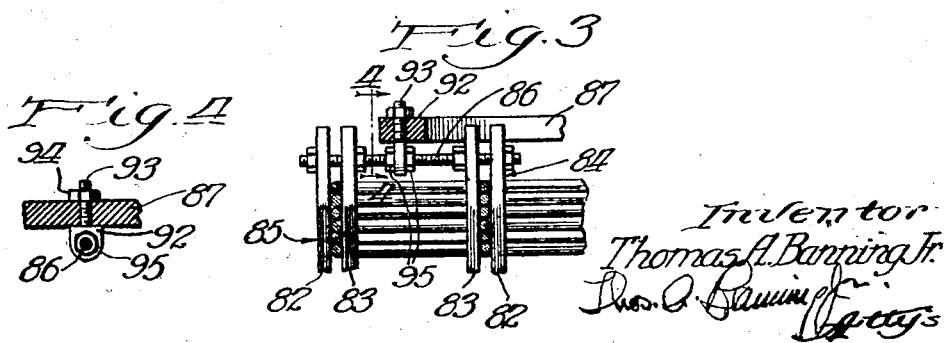

May 1, 1928.
T. A. BANNING, JR
1,667,715
INDUCTIVE UNIT AND THE LIKE
Filed Aug. 23, 1926
4 Sheets-Sheet 2
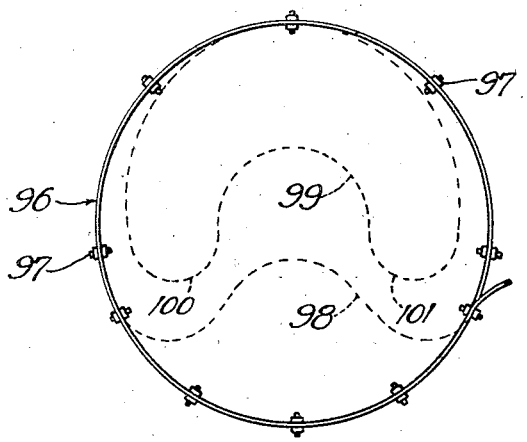
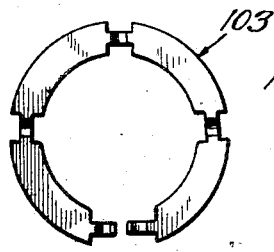
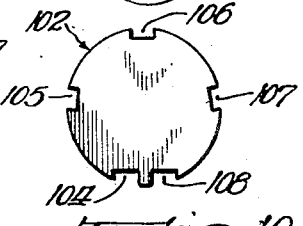
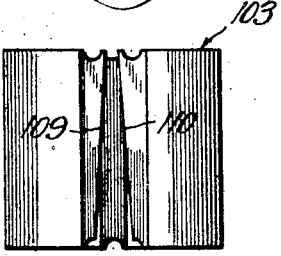
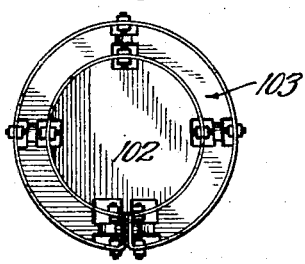
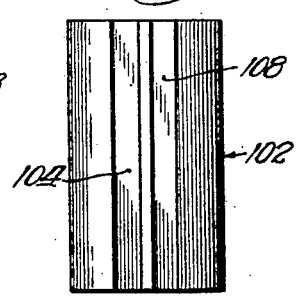
Inventor:
Thomas A. Banning Jr.

Inventor:
Thomas A. Banning Jr.

May 1, 1928.

T. A. BANNING, JR 1,667,715

INDUCTIVE UNIT AND THE LIKE

Filed Aug. 23, 1926    4 Sheets-Sheet 4

Inventor
Thomas A. Banning Jr.

Patented May 1, 1928.

1,667,715

UNITED STATES PATENT OFFICE.

THOMAS A. BANNING, JR., OF WILMETTE, ILLINOIS, ASSIGNOR TO TECHNIDYNE CORPORATION, OF NEW YORK, N. Y., A CORPORATION OF NEW YORK.

INDUCTIVE UNIT AND THE LIKE.

Application filed August 23, 1926. Serial No. 131,015.

This invention has to do with certain improvements in inductive units such as inductive coils. The invention herein disclosed is particularly intended for use in connection with radio receiving circuits and the like but it will presently appear that the features are in no wise limited to this or any other particular service.

The main object of the invention is to provide an improved coil of such construction and arrangement that the magnetic field thereof is self-contained to as large a degree as possible. That is to say it is an object to provide a construction such as that the external influence of the field will be reduced as much as possible; and it is a further object in this connection to accomplish the above result without impairment of the perfect self-inductive quality of the coil for the work intended.

Conversely, it may be stated that it is an object of the invention to provide a coil or inductive unit of such construction and arrangement that it will be practically uninfluenced by external magnetic fields, thus reducing its "pick-up" as much as possible.

It is well understood in radio work that sharp tuning without oscillation and using a maximum amount of power amplification requires that there shall be a minimum amount of exchange of effect between the various coils of the circuit. The main object therefore of the present invention is to provide coils of such arrangement that the exchange of magnetic influences between them will be reduced to a minimum value.

Briefly stated my invention consists in the provision of what I may term a "shading coil" around the position of the central coil; said shading coil being excited with current in such direction as will cause the returning magnetic lines of force of the main coil to be confined closely to said coil, thus preventing said lines of force from spreading out beyond a specified limit and into territory where their presence is objectionable.

Sometimes this shading coil is an integral portion of the main coil itself, turn for turn; sometimes it is a separate coil surrounding the main coil in whole or in part; sometimes it is of the same number of turns as the main coil; sometimes it is of a different number of turns, preferably a smaller number; sometimes the shading coil itself comprises two or more sections; and many other arrangements may be devised. Ordinarily, however, but not always, the current in the shading coil is identically the same current as that flowing through the main coil, since ordinarily the main and shading coils are connected into series with each other but in such a manner that their respective current flow directions are properly related for the purpose intended.

In order that the features of the invention may be better understood reference may be had to the accompanying drawings in which Figure 1 shows a plan view of the coil embodying the features of the present invention;

Fig. 2 is a front view of the coil of Fig. 1;

Fig. 3 is a fragmentary section on the line 3—3 of Fig. 1, looking in the direction of the arrows but on an enlarged scale;

Fig. 4 is a fragmentary cross section on the line 4—4 of Fig. 3 looking in the direction of the arrows;

Fig. 5 shows a plan view of the original helix of coil for making up a coil such as shown in Figs. 1 and 2, but on a smaller scale, and shows by dotted lines 2 consecutive folding or bending positions of the coil as it is formed into U-shape;

Fig. 6 shows a view of the coil when its central portion has been folded completely around the central mandril;

Fig. 7 shows a plan view of the central mandril;

Fig. 8 shows a plan view of the annular mandril;

Fig. 9 shows a front elevation corresponding to Fig. 8;

Fig. 10 shows a front elevation corresponding to Fig. 7;

Fig. 11 shows a plan view corresponding to Fig. 6, but after the annular mandril has been set into place;

Before proceeding to a description of the various figures I will state that according to my invention I contemplate the provision of a shading coil or coils in conjunction with the inductive solenoid itself, said shading coil or coils serving to direct the main body of the lines of force of the magnetic flux back to the other end of the solenoid and avoid dispersal of the flux throughout the surrounding ether. In other words this shading coil or coils serves to confine the body of the returning flux closely to the main solenoid and thereby practically eliminate interference of said flux with other adjacent objects and circuits.

Figure 12:
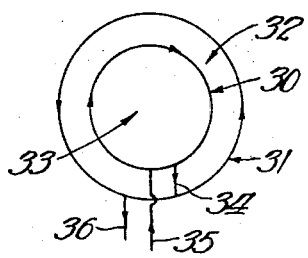
Fig. 12 shows a plan view of another form of coil embodying the features of the present invention.
Figure 13:
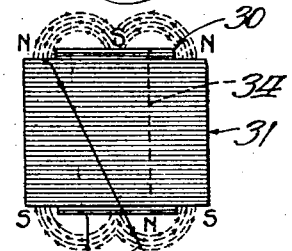
Fig. 13 shows a side elevation corresponding to Fig. 12.

Referring first to the arrangement shown in Figures 12 and 13, there is provided a single central solenoid 30 wound in the ordinary manner and either provided with a core of magnetic material or left without any such core. Assume the current as flowing around the solenoid circuit in the clock-wise direction shown by the arrows in Figure 12, there will be generated within said solenoid a magnetic flux, a south pole at the top and a north pole at the bottom as indicated by the letters in Figure 13.

This flux will pass out of the bottom of the solenoid and into the surrounding space and return into the top of the solenoid after the general fashion of the lines and arrows indicated in Figure 13.

Assuming that there is no protective influence around the solenoid 30, that portion of this flux returning through the outside atmosphere and space will be unconfined and will exert an influence on adjacent bodies and circuits. In the case of radio circuits this influence is often known as "coupling" or "pick-up".

According to my present invention I provide another shading coil 31, which embraces the coil 30 and serves to practically confine the returning portions of the lines of force so that they are brought and retained within a very narrow space and their external influence on surrounding objects and circuits is practically eliminated.

In the arrangements shown in Figures 12 and 13 this shading coil 13, in the form of another solenoid 31 placed around the solenoid 30 but separated therefrom so as to establish an air-space 32 of substantial size through which the returning flux may pass. Generally speaking the cross sectional area of space 32 when viewed as in Figure 12 should be equal to or preferably greater than the cross sectional area of the space 33 within the main solenoid 30. In other words this space 32 is large enough to accommodate the returning portion of the flux without seriously crowding it. Upon passing a current through the shading coil 31 in a direction opposite to that in the coil 30, when viewed as in Figure 12 the coil 31 will itself generate a magnetic influence in the opposite directions from that generated by the coil 30, that is, the coil 31 will tend to generate a north pole at its upper end and a south pole at its lower end as shown by the letters in Figure 13. Under these conditions it will be evident that flux passing out of the bottom end of the coil 30 will be drawn into the space between the coils, and will travel up through said space 32 and will pass out at the upper end thereof and return into the upper end of the space 33 within the main coil 30. By this means the amount of flux which is allowed to stray into the surrounding ether will be largely eliminated, and a practically "fieldless" coil will be produced, and one which will be practically zero coupling and no pick up.

Preferably the currents in the coils 30 and 31 are the same identical current. This result is secured by connecting together the two coils 30 and 31 by a connection 34 in such a way that the same current will pass through the coils in opposite directions when viewed as in Figure 12. For example current entering the bottom end of the main coil 30 by the wire 35 will pass around the coil 30 in a clock-wise direction, then across the connection 34, then around the coil 31 in a counter clock-wise direction, and then out through the wire 36. With this system of operation the current value in the shading coil 31 is the same as that in the main coil 30.

It is to be noted that by establishing a substantial air-space 32 between the two coils there is produced a system of operation which is entirely different from that which would be produced if no such air-space were present. This is because said air space allows the flux of the main coil to return through a magnetically controlled area through which said flux is able to flow. Therefore, said shading turns do not simply neutralize a corresponding number of turns of the main coil. But they perform a new and very useful function for inductive units particularly intended for radio reception.

It will be noted that in the arrangement of Figures 12 and 13, the current first passes entirely through one of the coils and then entirely through the other coil.

Figure 14:
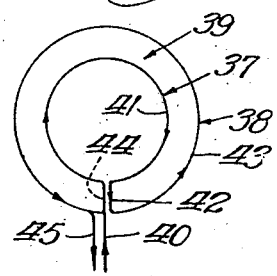
Fig. 14 shows a plan view of the coil of Figs. 1, 2, 3, and 4.
Figure 15:
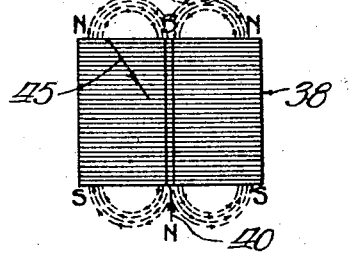
Fig. 15 shows a side elevation corresponding to Fig. 14.

Referring next to the type of construction shown in Figures 14 and 15, this also includes coils 37 and 38 which are concentric with respect to each other and separated to establish the return flux space 39. In the present instance, however, each turn of the coil 37 is continuous with a corresponding turn of the coil 38. This is accomplished by winding the entire unit in the following manner;

One of the terminal leads 40 reaches into the central coil 37, and the wire then passes around the turn 41 of the central coil, to establish a practically complete circle. The wire then passes outwards in the connection 42 and then continues as a turn 43 of the shading coil 38. This turn 43 continues backwards for practically a complete circle and then reaches inwards through a connection 44 to the position of the coil 37 and then establishes another turn around the coil 37. In this way each convolution of the wire includes a turn of the inner coil 37 extending in one direction around the circle and also includes a turn of the other coil 38 extending in the other direction around the circle, the connections 42 and 44 having a sufficient radius to establish the air-space 39.

Finally the wire passes away from the unit by means of the terminal lead 45.

I will presently explain by reference to Figures 1 to 11 inclusive, a very convenient manner of winding and mounting the coil illustrated in 14 and 15.

It will be noted that in the arrangement of Figures 14 and 15 there are the same number of turns in the coil 37 as in the coil 38. In some cases it may be desirable to use a larger number of turns in the central or main coil than there are in the outer or shade coil.

Figure 16:
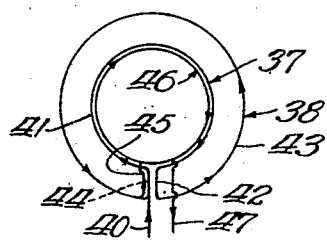
Fig. 16 shows a plan view of another form of coil in which the inner section has a larger number of turns than the shading section.
Figure 17:
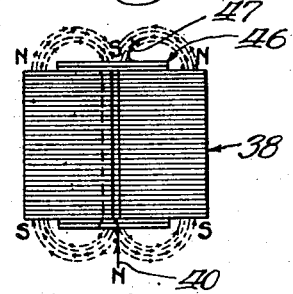
Fig. 17 shows a side elevation corresponding to Fig. 16.

In the construction of Figures 16 and 17 the above result may be secured of establishing more turns in the main coil than in the shading coil. The construction illustrated in said figures includes a winding having the central turns 37 together with the shading turns 38, these parts being established in the same way as the corresponding parts of the unit of Figures 14 and 15.

In addition to the above the construction of Figures 16 and 17 includes another solenoid 46 set closely into the turns 37 so as to add its magnetizing effect to the turns 37. With this arrangement the current enters through the terminal wire 40, passes around a turn 41 of the coil 37, passes across the connection 42 to the corresponding turn 43 of the coil 38, passes around to the corresponding connection 44 and across to the next turn of the coil 37, and thus back and forth around the unit until the two coils 37 and 38 have been completed. Thereupon, the current passes across a connection 45 to the supplemental inner solenoid 46; and then passes around the consecutive turns of the solenoid 46 to the final terminal connection 47. In this way the main central coil has a greater number of turns than the shading coil but a number equal to the turns contained within the supplemental solenoid 46.

Figure 18:
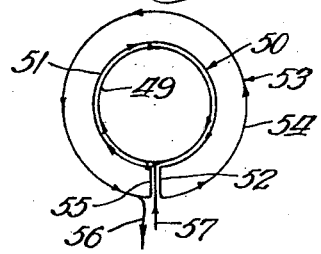
Fig. 18 shows a plan view of another form of coil having a larger number of turns for the inner section than for the shading section.
Figure 19:
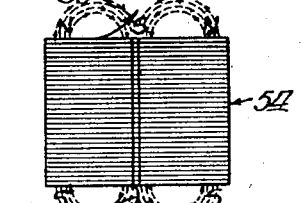
Fig. 19 shows a side elevation corresponding to Fig. 18.

In Figures 18 and 19 there is shown another arrangement in which the central coil is provided with more turns than the shading coil, the unit in this case also being wound in a fashion somewhat similar to that in Figures 14 and 15.

In the case of Figures 18 and 19 the current enters through a terminal connection 57, passes around the turn 49 of the central coil 50, then makes another turn 51 around said central coil 50, thus establishing two complete turns. The wire then passes by a connection 52 to the position of the shading coil 53, and passes by one turn 54 around said shading coil in a reverse direction, and then across by connection 55 back to the position of the main coil 50. It then makes two complete turns around the main coil 50, then passes over to the shading coil 53 and makes one turn in the reverse direction; and this procedure is followed until the unit has been completed. Thereupon the current passes away by the terminal connection 56, the other terminal connection being designated 57.

Figure 26:
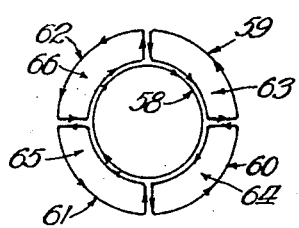
Fig. 26 shows a plan view of an arrangement using a single circular central coil together with a series of four sections of shading coils placed around the same.
Figure 27:
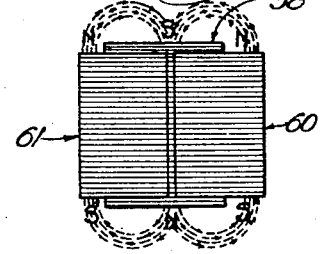
Fig. 27 shows a side elevation corresponding to Fig. 26.

In the arrangement of Figures 26 and 27 there is provided a central solenoid 58 together with a series of shading sectional coils 59, 60, 61 and 62 set into proximity to the main coil so that the inner faces of the shading coils are close to the main coil, and the outer faces of the shading coils are separated from the main coil a sufficient distance to establish the return air-space 63, 64, 65 and 66, for the returning flux. The main solenoid 58 together with the various shading coils, are all connected up in such a manner that the currents of the inside faces of the shading coils flow in the same direction as the currents in the main coil, this fact being evidenced by the arrow-heads in Figure 26. Similarly, the currents in the remote portions of the shading coils flow in opposite directions around the circle as indicated in Figure 26 so as to establish the desired consequent north and south poles as indicated in Figure 27.

Figure 20:
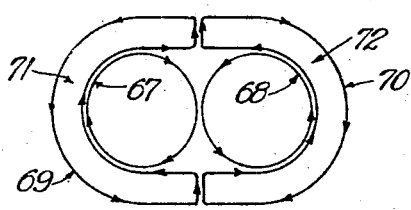
Fig. 20 shows a plan view of another form of coil embodying the features of the present invention of which use is made of two inner sections with current flowing through them in opposite directions so as to generate consequent poles, the top and bottom together with shading coils of proper polarity embracing the same.
Figure 21:
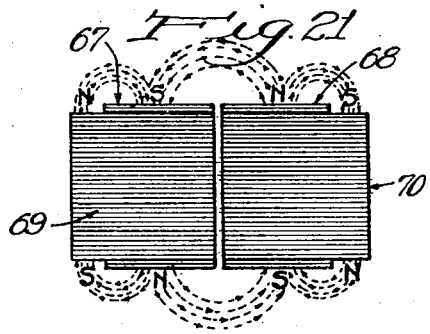
Fig. 21 shows a side elevation corresponding to Fig. 20.

In Figures 20 and 21 I have shown a double coil arrangement including the central solenoids 67 and 68 through which the current is passed in opposite directions around the circle so as to establish the consequent poles at their top and bottom ends as illustrated in Figure 21. Around these two main coils there are hooked the horseshoe shaped shading coils 69 and 70 respectively, having within them the air-spaces 71 and 72 to accommodate the returning flux by establishing consequent poles such as shown in Figure 21.

Figure 22:
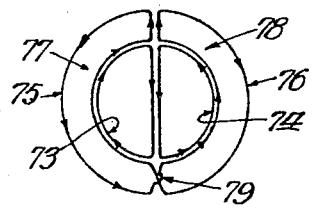
Fig. 22 shows a plan view similar to that of Fig. 20 with the exception that inner sections are D-shaped and the outer shading sections have their turns continuous in the two outer sections.
Figure 23:
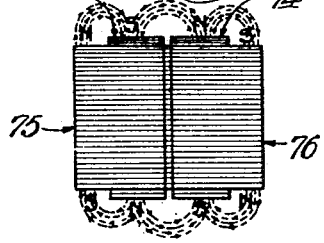
Fig. 23 shows a side elevation corresponding to Fig. 22.

The arrangement of Figures 22 and 23 is similar to that of Figures 20 and 21 with the exception however that the central coils 73 and 74 are D-shaped, having their flat sides brought into proximity with each other so as to bring the structure into a smaller and more compact space and substantially within the confines of a cylinder.

In the case of Figures 22 and 23 there are provided the shading coils 75 and 76 respectively, the same having the air-spaces 77 and 78 to accommodate the returning magnetic flux; and the currents flowing through the turns of the shading coils are properly directed so as to establish consequent poles as illustrated in Figure 23 in order to control the returning flux.

It will be noted that in the construction of 22 and 23 each turn of the coil 75 is integral with a corresponding turn of the coil 76, this result being secured by the presence of the cross connections 79 at one side of the structure.

Figure 24:
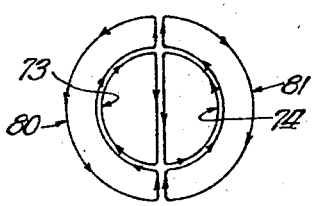
Fig. 24 shows a plan view similar to Fig. 22 with the exception that the shading coils are formed with their turns distinct and independent of each other.
Figure 25:
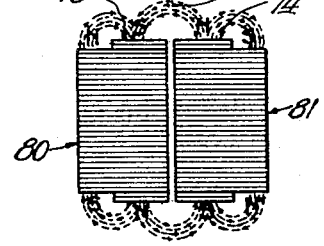
Fig. 25 shows a side elevation corresponding to Fig. 24.

The arrangement of Figures 24 and 25 is similar to that of 22 and 23 with the exception that in the present case each of the shading coils 80 and 81 is completely self-contained, and in the form of a horseshoe or semi-circle.

It will further be noted that the arrangements of Figures 22 and 23, and 24 and 25, are such that the shading coils can be turned around with respect to the main coils which they shade so as to occupy other positions than illustrated in the drawing. In this connection it is noted that as shown in the drawing the plane between the coils 75 and 76 or the plane between the coils 80 and 81 is co-incidental with the plane between the main coils 73 and 74; but the shading coils can be turned in either direction with respect to the main coils so as to bring said planes out of co-incidence.

Referring now to Figures 1 to 11 inclusive I have therein shown in detail a physical construction of inductive unit of the form shown in Figures 14 and 15. This inductive unit is held together and held in proper form by means of pairs of sticks or the like such as 82 or 83 which are drawn together in any convenient manner to support the turns of wire between them and grip said turns very firmly by using a minimum amount of actual contact with the turns of the wire. These sticks may be of any convenient material such as bakelite, fibre, etc., so as to have a minimum amount of dielectric capacity.

Preferably there is a pair of sticks 84 for the inner coil opposite to each pair 85 for the outer coil as shown in Figure 1; and each pair 84 and corresponding pair 85 may be held in proper spaced relationship by the use of a threaded nipple 86, together with small nuts threaded thereon as clearly shown in Figures 1 and 2.

Top and bottom end rings 87 and 88 are provided, the same having a diameter substantially equal to the main diameter of the air-space 89 between the main and shading coil.

The end terminals 90 and 91 of the inductive unit are conveniently mounted on or adjacent to one of the pairs of sticks as shown in Figures 1 and 2.

Each of the threaded nipples 86 is conveniently secured to the adjacent end ring 87 or 88 as the case may be by means of a small bracket 92 having a threaded stem 93, which may be secured to the end ring by a nut 94. The threaded nipple is properly spaced within the bracket 92 by a pair of nuts 95 as shown in Figures 3 and 4.

The coil of Figures 1, 2, 3 and 4 may first be wound as a circular solenoid 96 shown in Figure 5. Each turn of this solenoid is sufficiently large to have a length equal to one turn of inner or main coil plus one turn of outer or shading coil plus cross connections 42 and 44 (such as shown in Figure 14).

After this solenoid 96 has been wound the various pairs of sticks may be temporarily secured to it by short bolts 97 and nuts as shown in Figure 5, and at the proper position around the circumference of the coil.

If an electric current of given intensity is passed through this large solenoid 96 it will produce a north pole at one end and a south pole at the other end as is well understood in the art. By pressing in on one face of the solenoid of Figure 5 it will be deflected into the form shown by the dotted line 98 and by continued movement into the position of the dotted line 99. Assuming that the space originally enclosed by the coil at its top end was a north pole, and that the space around the outside of the top end of the coil had a south polarity, it is evident that during the distorting movement to the dotted line positions 98 and 99 this relationship will be maintained. That is to say, that at the dotted line position 99 the space within the coil at its upper end will have north polarity and the space outside the coil at its upper end will be south polarity. By continuing the distorting movement a sufficient amount the portions 100 and 101 will ultimately be brought together substantially as shown in Figure 6, and by thereafter finishing the operation the entire unit may be brought into a perfectly shaped double unit of the form shown in Figures 1 and 2.

It will be noted that when this has been done the space originally embraced within the solenoid 96 having north polarity at its upper end becomes the shading space 39 of Figure 14 or 89 of Figure 1; and that the space originally outside of the solenoid 96 of Figure 5 becomes the space within the main coil 41 of Figure 14 and within the main coil of Figure 1. From the above analysis it will be evident that by shaping the combined unit so as to establish the return flux air-space 39 the turns of the shading coil do not oppose or neutralize corresponding turns of the main coil but simply shade the flux and compel it to remain within prescribed limits.

The operation of bringing the large solenoid 96 into the completed form is conveniently performed by the use of mandrils 102 and 103 shown in Figures 7, 8, 9 and 10. The mandril 102 has slots 104, 105, 106, 107, and 108 respectively to receive the proper sticks so that the mandril 102 may be pressed against the face of the solenoid 96 and said solenoid is in effect wrapped around the mandril into the dotted line illustrated. When the wrapping operation has proceeded to the point illustrated in Figure 6 the mandril 103 may be forced down through the airspace 39 so as to bring the coil into the form of Figure 11. This operation is facilitated by forming the beveled faces 109 and 110 on the adjacent edges of the annular mandril 103.

While the coil is held in the form of Figure 11 the various bolts 97 may be removed in proper sequence and the corresponding threaded nipples 86 substituted, together with the brackets 92, and thereafter the end ring at one end may be set and fastened in place.

When the operation has proceeded to the above point the mandril 103 may be slipped out of the other end of the device and then the threaded nipples 86 substituted at that end, and the end ring at that end fastened into place so as to complete the operation.

The number of turns to be used on the coil will of course depend entirely upon the circuit with which it is intended to be used and also the purpose of said circuit, as well as the wave length of radio waves being received if the coil is used for radio reception. The number of turns might range from 15 to 100 or more or less but this statement is not intended in any way as a limitation either on the number or character of the turns.

It will also be noted that in some of the structures illustrated the "turns" of the main coil are continuous, convolution after convolution, in the sense that the current passes consecutively from one convolution of such coil to the next convolution thereof, as for example in Figures 12 and 13; and this is also true of the turns of the shading coils illustrated in some of the figures as for example Figures 12 and 13.

On the other hand in some of the structures illustrated herein, as for example, Figures 14 and 15, each turn of a main coil is discontinuous and separated from the next turn or turns thereof by the intervening length of a turn of shading coil; and this is also true of the shading coil constructions illustrated in some of the figures.

It will therefore be understood that where in the claims I use such expressions as turns, or convolutions, or coils, either main or shading, or the like, that I contemplate all of the different types of constructions herein illustrated and described, as well as others of equivalent structures and functions except as I may otherwise limit myself in the claims.

It will be understood that if desired a primary coil may be used in conjunction with any of the inductive units herein desclosed, but I have not considered it necessary to illustrate or describe the same inasmuch as the use of the primary coils in conjunction with inductive units is well understood in this art.

I claim:

1. An inductive unit for the purpose specified comprising in combination a continuous length of wire bent to establish a series of horse-shoe shaped convolutions each including a discontinuous inner turn together with a discontinuous outer turn of sufficiently larger diameter than the inner turn to establish a substantially large air-space between the turns, the discontinuous ends of the inner and outer turns being connected respectively to the outer and inner turns and to the turns of the joining convolutions to establish a continuous electrical circuit through the system with flow of current through all of the inner turns in one direction and with flow of current through all of the outer turns in the outer direction when viewed from one end of the structure, together with means for retaining all of the inner and all of the outer turns respectively in alinement and for maintaining the structure in substantially circular form, whereby there are established co-axial inner and outer coils with equal numbers of turns, said coils being separated from each other by a substantially large annular air-space, and whereby current flows in opposite directions through the two coils substantially as described.

2. As a new article of manufacture an inductive unit for the purpose specified comprising in combination a continuous length of wire bent to establish a series of U-shaped members connected up in series relationship and each comprising inner and outer turns separated from each other by a substantially large air-space, said turns being connected together in such a manner that current flows through all of the inner turns in one direction and through all of the outer turns in the other direction when viewing the structure from one end, together with means for retaining all of the inner turns and all of the outer turns respectively in alignment with each other, the cross sectional area of the air-space within the inner turns being substantially equal to the cross sectional area of the air-space between the inner and outer turns substantially as described.

3. As a new article of manufacture an inductive unit for the purpose specified comprising in combination inner and outer coils, means for retaining said coils co-axial with respect to each other, the outer coil being substantially larger in diameter than the inner coil to thereby establish a substantially large air-space between the coils, said air-space having a cross sectional area substantially equal to that of the inner coil, together with connections between the two coils placing them in series connection and to cause current to flow through all of the turns of one coil in one direction and through all of the turns of the other coil in the opposite direction substantially as described.

4. As a new article of manufacture an inductive unit for the purpose specified comprising in combination inner and outer substantially parallel coils, means for retaining said coils in substantially parallel relationship, the outer coil being substantially larger than the inner coil to thereby provide a substantially large air-space between the coils, together with suitable connections between the coils serving to cause current to flow through all of the turns of one coil in one direction and through all of the turns of the other coil in the other direction when viewed from one end substantially as described.

5. As a new article of manufacture an inductive unit for the purpose specified comprising in combination a pair of co-axial coils of different sizes to establish a substantially large air-space between the coils, said air-space having a cross sectional area substantially equal to the cross sectional area within the air-space of the central coil, the central coil having a greater number of turns than the outer coil, together with connections between the two coils to cause current to flow through all of the turns of one coil in one direction and through all of the turns of the other coil in the other direction when viewed from one end of the structure substantially as described.

6. As a new article of manufacture an inductive unit for the purpose specified comprising in combination a central coil having its turns connected for current flow in the same direction when viewed from one end of the structure, together with a series of shading turns enclosing said coil but separated therefrom a substantial distance to establish a substantially large air-space, together with suitable connections for causing current to flow through the shading turns in a direction contrary to the direction of flow through the central coil when viewed from one end of the structure substantially as described.

7. As a new article of manufacture a central coil through which current flows in a given direction when viewed from one end of the structure, together with a group of arcuate shading turns in proximity to and co-axial with the main coil but separated therefrom a substantial distance to establish an arcuate air-space, together with connections for causing current to flow through the shading turns in a direction contrary to the direction of flow through the main coil when viewed from said end substantially as described.

8. As a new article of manufacture an inductive unit for the purpose specified comprising in combination a coil, connections for causing current to flow through the same in a given direction when viewed from one end of the structure, and a series of arcuate shading turns co-axial with but separated from said main coil a substantial distance to thereby establish a substantially large air-space between the main coil and the shading coil, together with connections for causing current to flow through the shading turns in a direction opposite to that of the flow of current through the main coil substantially as described.

9. As a new article of manufacture an inductive unit for the purpose specified comprising in combination a pair of coils one of which embraces the other, said coils being separated a substantial distance from each other to thereby establish a substantially large air-space between the coils, together with connections for causing current to flow through one coil in one direction and through the other coil in the other direction when viewed from one end of the structure substantially as described.

10. As a new article of manufacture an inductive unit for the purpose specified comprising in combination inner and outer arcuate coils concentric with each other together with connections for insuring flow of current through one coil in one direction and through the other coil in the opposite direction when viewed from one end of the structure substantially as described.

11. As a new article of manufacture an inductive unit for the purpose specified comprising in combination co-axial magnetizing coils separated from each other a substantial distance to thereby establish a substantially large space between them for the return of magnetic flux, together with connections for causing flow of current through said coils in opposite directions when viewed from one end of the structure substantially as described.

12. As a new article of manufacture an inductive unit for the purpose specified comprising in combination co-axial magnetizing coils of substantially different sizes one within the other, and having between them a substantially large space for the return of magnetic flux, together with connections for causing currents to flow through said coils in opposite directions when viewed from one end of the structure substantially as described.

13. As a new article of manufacture an inductive unit for the purpose specified comprising arcuate co-axial means for generating magneto-motive forces in opposite directions, said devices being separated from each other a substantial distance to provide a substantially large space for the return of magnetic flux substantially as described.

14. A coil system comprising an inner coil section and an outer coil section connected to produce opposing fluxes of different magnitude in the core of the inner coil section, the product of the number of turns and area of the inner coil section being related to the product of the number of turns and area of the outer coil section to produce neutralizing magnetic fields at a distance.

15. A coil system comprising inner and outer coaxially arranged cylindrical coil sections connected to produce opposing fluxes of different magnitudes in the core of the inner coil section and a flux in the annular space between the coil sections, the product of the number of turns and area of the inner coil section being related to the product of the number of turns and area of the outer coil section to produce neutralizing magnetic fields at a distance.

THOS. A. BANNING, Jr.